United States Patent Office 3,212,237
Patented Oct. 19, 1965

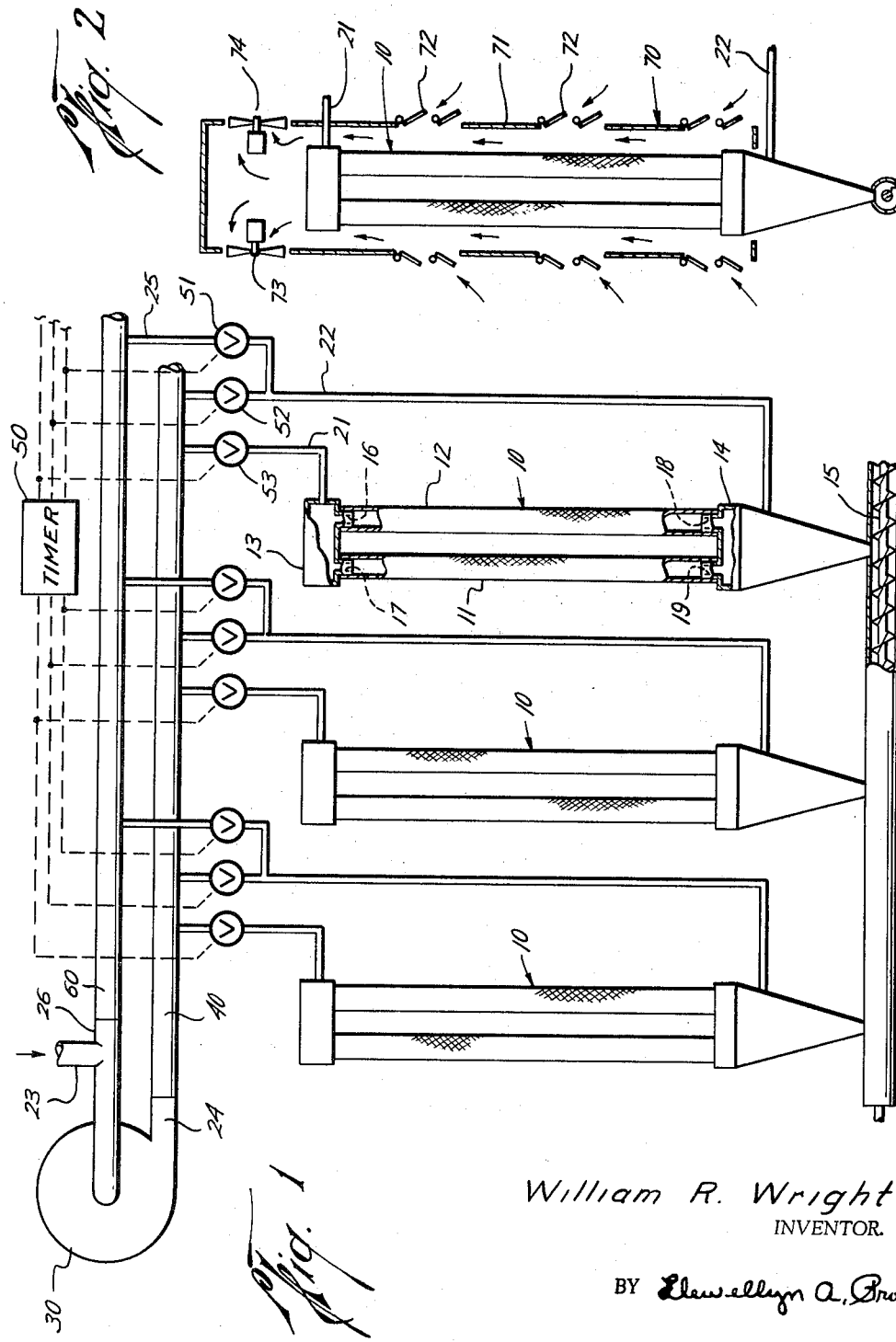

3,212,237
METHOD AND APPARATUS FOR FILTERING GAS STREAMS
William R. Wright, Rockport, Tex., assignor to Ashland Oil & Refining Company, Houston, Tex., a corporation of Kentucky
Filed Feb. 12, 1963, Ser. No. 258,060
5 Claims. (Cl. 55—96)

This invention relates to the art of separating finely divided solids from aerosols. In particular, it relates to method and apparatus for filtering gas streams containing fine solid particles such as carbon black, especially such streams of high moisture content.

Numerous commercial processes involve the recovery of solids from gas streams. While the separation of solid particles from aerosols presents many problems generally, the separation of carbon black from an off gas or process gas stream is particularly acute. This results largely because of the necessity of completely cleaning a process gas stream, even beyond the point of economic expediency, so that none of the carbon black will be vented to the atmosphere. Such thorough cleaning of gas streams invariably necessitates the use of bag filter devices, generally following one or a sequence of other carbon black separating devices such as electrical precipitators, cyclone separators and the like.

Used even for the secondary cleaning of such streams, however, such bag filter devices leave much to be desired. This is largely because of the extreme fineness of carbon blacks which are made up of infinitesimally fine particles, finer perhaps than those of any other commercial product. Thus, these particles of carbon black have diameters well down in the colloidal range generally ranging in average particle diameter of from about 21 to 83 millimicrons. But moreover, the problem of separation of carbon blacks from gas streams is further intensified inasmuch as the processes from which these blacks originate produce gas streams which are invariably very high in moisture content. The dual combination of extreme fineness and high moisture militate directly against filtering efficiency which is directly related to the effective filter surface availability or total pores free and clear of moisture and particles which tend to clog and completely close these pores.

Most carbon blacks are formed by pyrolytic cracking of a normally liquid hydrocarbon fed into a reactor. The feed hydrocarbon is contacted with a hot surface or with hot combustion gases of fuel and oxygen, generally natural gas and air. In such processes the feed hydrocarbon dissociates into carbon black solid particles suspended in an intensely hot effluent gas generally ranging in temperature from about 2300° F. to 3300° F. Combustion or partial combustion of the hydrocarbon and the fuel inherently produces some water, which appears in process streams as vapor. Moreover, large additional quantities of cooling water are deliberately added to process streams. Thus, because of the extremely high temperature of the effluent gas from the reactor it is generally necessary to quench with water to cool the gas to a temperature at which the effluent can be processed for removal of the carbon black. To sufficiently cool the effluent gas it is generally necessary to add enough water so that the total effluent is increased by as much as about seventy percent of its original volume. This drastic increase of total effluent obviously requires greater initial bag filter capacity with proportionately increased maintenance.

Generally, in manufacturing carbon black the moisture laden off gas from a reactor, or a plurality of reactors, is passed through filters of the multiple bag type normally consisting of a plurality of compartments. Each compartment generally contains a plurality of long filter bags each provided with valve inlet and outlet means for conveying the gases through the compartments and consequently through the filter bags. While there are many kinds of such filter devices a fundamental operation of essentially all is that a normal operating cycle includes a filtering operation and a purging operation for dislodging carbon black particles from the pores of the filter bags. Generally these involve discrete sequential steps constituting a passage of a gas process stream through a set of bags for a time; followed by a reversal of gas flow or flow of gas through the pores of the bags from the opposite direction. Sometimes these steps, particularly the purging step, are accompanied by "agitation" of the bags to dislodge particles which adhere to their inner surfaces. This agitation is generally produced by either subjecting the moorings upon which the bags are attached to mechanical shaking or by subjecting the bags to sonic vibration from whistles, sirens, horns and the like. In addition, a normal cycle of operation of a bag filter often includes a null period, following the purging portion of the cycle, to permit the dislodged carbon black particles to fall downwardly for collection prior to initiation of another operating cycle. Normal practice requires, for these reasons, a plurality of bag filter compartments so that filtering can be performed in some compartments while in others the bags are being purged or subjected to a null or off-period for settling of the particles.

Because of the extreme fineness of the carbon black particles the pores of the filter bags are easily clogged and the dislodging of these particles is extremely difficult. Where the off gas condenses and wets the walls of the filter bags, as invariably happens in start-up, the bags should be dried before actual production starts otherwise dislodging of the carbon black particles is extremely difficult, and ofttimes impossible. Moreover, particularly during start-up when the hot process gas is introduced into one end of the filter bags the clean filter bag will allow the hot gas to channel through and warm the inlet portion of the filter bags while the remaining portions remain cold. This non-uniformity of heat distribution causes condensation of moisture upon the cooler portions of the bag surfaces. The filtering efficiency of the bags is impaired, particularly because parts thereof are often clogged so that these portions of the bags are rendered inoperable. Furthermore, once moistened the bags are often slow drying so that the problem can remain for a considerable time after start-up.

Accordingly, it is an object of the present invention to obviate these and other disadvantages by providing the art with an improved bag filter assembly for the filtering of solids from aerosols. Particularly, it is an object to provide method and apparatus for filtering carbon blacks from carbon black containing process streams. More particularly, it is an object to provide method and apparatus capable of extended use and without the necessity of the normally required high insulation cost. A further object is to provide a novel method and apparatus combination for more effective filtering and purging of off gas streams heavily laden with carbon black. Yet further, it is an object to provide such combination for handling off gas streams at a wide range of carbon black concentrations, alone or in combination with other carbon black separating devices.

These and other objects are achieved in accordance with the present method comprising passing an aerosol into the inner portion of a filter bag and applying a positive pressure to force the gas through the surfaces of the filter bag and to retain the solids portion of the aerosol within the bag, rapidly withdrawing aerosol from within the bag during a short interval to cause the filter bag to flex inwardly, then purging the bag with aerosol by application of a positive downward flow to force accumulated solids from the bag. In the preferred practice of the invention, the aerosol, or effluent gas containing carbon black particles or "smoke," is fed into the filter bag from both ends during the initial or filtering portion of an operating cycle. Following this, a negative pressure is applied upon the interior of the bag and aerosol is withdrawn this causing the bag to flex inwardly. Preferably, the bag is instantaneously collapsed, partially or completely, for an interval of short duration and then a positive flow is applied downwardly with the aerosol upon the contents of the bag to effect discharge thereof.

In another embodiment moisture condensation upon bag filter surfaces is virtually eliminated and the use of the normally required insulation reduced or eliminated. This is accomplished by enclosing the filter bag, or bags, within a structure having adjustable louvred openings. Pursuant to this embodiment ambient atmospheric air is admixed with the desired proportions of the warm moisture bearing off-gas emanating from within the filter bag so that the dew point of the mixture is not reached. But, even where the ambient atmospheric air is too moist or too cold, or both, to entirely eliminate condensation of the resultant mixture, the bags are nevertheless protected by the shielding effect of the hot off-gas flow outwardly from the bags, the mixing occurring at a point away from the bags.

The invention will be better understood by reference to the following detailed description of apparatus embodiments and to the accompanying drawings making reference thereto, wherein:

FIGURE 1 is a schematic elevation view of a bag filter assembly in combination with a fan-smoke header assembly; and FIGURE 2 is a schematic elevation view of a bag filter assembly identical to that shown in FIGURE 1 except that it is enclosed within a louvred structure.

A bag filter assembly 10, as shown by reference to FIGURE 1, is constituted of at least one, and preferably a plurality of filter bags 11, 12 the upper portions of which are attached and suspended from a plenum 13, and the lower portions of which are attached upon a collection hopper 14. The plenum 13 includes a space, enclosed, except where provided with openings for entry of smoke and for discharge of smoke into the filter bags 11, 12. Thus, the plenum 13 provides a smoke entry feature via line 21 and discharge ports via openings 16, 17 (shown by dotted lines) in the lower side of the plenum 13 for downward entry of the smoke into the filter bags 11, 12. A single discharge port is generally provided for each filter bag suspended from the plenum 13. Directly below plenum 13 is located a collection hopper 14 for receiving smoke and for collection and discharge of the solids particles filtered from the smoke. The collection hopper 14 is similar in function to the pleunm 13 inasmuch as it is constituted of an enclosed space with entry and exit features for entry and discharge of smoke. It differs however in that it also serves as a collection medium for the solids particles; and also provides for the discharge thereof. Thus, the lower end of each of the filter bags 11, 12 are fitted upon ports 18, 19 (shown by dotted lines) located upon the upper side of the collection hopper 14. The smoke enters, during a filtering portion of an operating cycle, the hopper via line 22 and exits upwardly via the ports 18, 19 into the filter bags 11, 12. At the bottom thereof is collected the solids particles which are separated from the smoke. Preferably the lower portion of the hopper 14 is smaller than the upper portion to facilitate removal of the collected solids. The solids particles are discharged via rotary seal 15 and collected, by means well known to the art and forming no part of the present invention. The rotary seal 15 permits removal of the solids particles without the opening of the hopper 14 to the atmosphere.

Operatively connected with one or more of the bag filter assemblies 10 is a fan 30. The fan 30 has a suction and discharge side. The discharge side of fan 30 is via line 24 operatively connected with a smoke header 40.

The suction side of the fan 30 is via line 23 which operatively connects the fan 30 with an off-gas or process stream; or with a smoke header which collects a plurality of such streams. The suction side of the fan 30 is also connected to the collection hopper 14 via line 26 which joins line 23 to a smoke header 60. Smoke header 60 in turn is joined to the collection hopper 14 via valved line 25 which connects to line 22 connecting directly to the hopper 14.

A plurality of bag filter assemblies corresponding in structure, function and operation to the bag filter assembly 10 can be connected in parallel through their plenums and collection hoppers to the smoke headers 40, 60. Thus, the plenum and collection hopper of each unit will be provided with a pair of valved lines to the smoke header 40 corresponding in operation to lines 21, 22. Line 22 of each collection hopper connects to the smoke header 60 via a valved line similar in operation and function to line 25 by means of which the opening and closing of line 22 to the smoke header 60 is controlled. Pursuant to this combination a single fan 30 operatively connected via line 26 to smoke header 60 and via line 24 to smoke header 40 can provide the desired cycle of operation for any number of such assemblies.

A timer relay control mechanism 50 provides for the automatic discharging of smoke to the filter bags 11, 12 of the bag filter assembly 10, or corresponding units, during the filtering portion of the operating cycle; for its discontinuance and application of a negative pressure at the cleaning portion of the cycle whereupon the filter bag 11, 12 are momentarily flexed inwardly; and for the purging of the filter bags 11, 12 with smoke to complete the cycle. Specifically, the timer 50 provides for the opening and closing at the appropriate time of valve 53 in line 21 and valve 52 in line 22, and also for the appropriately timed opening and closing of valve 51 in line 25. For the filter portion of the cycle valves 52, 53 are both open and valve 51 is closed. Smoke is thus discharged from the header 40 via lines 21, 22 into the bag filter assembly 10. Immediately following the filter portion of the cycle valve 51 is opened and valves 52, 53 are closed. The sudden change to a negative pressure within the filter bags 11, 12 cause them to flex inwardly or collapse. Valve 53 is then opened while valve 52 remains closed and the pressure differential between the plenum 13 and hopper 14 causes a downward flow within the filter bags 11, 12 via flow of smoke through line 21 to plenum 13 while smoke is withdrawn from the collection hopper via line 22 this purging the bags 11, 12 of their contents, which falls into the collection hopper 14. Where a plurality of bag filter assemblies, such as bag filter assembly 10, are operatively connected to smoke headers 40, 60 in the manner described the timer 50 can also be used to control the filtering, cleaning and purging cycle of these units simultaneously and in corresponding manner.

Referring to FIGURE 2, is shown a bag filter assembly 10 similar in all respects to that of FIGURE 1, except that it is enclosed within a louvred structure 70.

The walls 71 of the structure 70 contain a number of adjustable louvres or adjustable openings 72 through which ambient atmospheric air can be drawn. Atmospheric air is pulled into the louvred structure 70 by means of exhaust fans 73, 74 located within the upper portion of the enclosing structure 70. The function of the structure 70 will be easily understood and fully appreciated by the description of the following operating cycle wherein reference is made to the figures.

In operation, timer 50 opens lines 21, 22 by opening of the valves 53, 52 in proper sequence and simultaneously closes line 25 via closing of the valve 51. Carbon black smoke is drawn from a smoke header through line 23 by operation of the fan 30, and is exited from the fan 30 via line 24 into the smoke header 40. At the smoke header 40 a bifurcation stream of carbon black smoke pours through lines 21, 22 into the plenum 13 and collection hopper 14, respectively, and enters into filter bags 11, 12 from both top and bottom. The gas passes through the walls of the filter bags 11, 12 to the outsides thereof and the carbon black is retained on the inside of the filter bags 11, 12. At the completion of this portion of the cycle the timer 50 momentarily closes valves 52, 53 and opens valve 51. This opens the collection hopper 14 to the suction side of the fan 30 through lines 22, 25, header 60 and line 26 which adjoins line 23. Immediately, but momentarily, the filter bags 11, 12 collapse or flex inwardly so that carbon black particles which adhere upon the inner walls thereof are shaken loose and dislodged. Valve 53 is then opened while valve 52 remains closed. Pressure mounts as smoke is forced into the upper portion of bags 11, 12 via line 21 and the contents of the bags 11, 12 is swept downwardly to the collection hopper 14 whereupon it is discharged via rotary seal 15. Following this, valve 51 is closed and valve 52 reopens to begin a new cycle of operation.

Where the bag filter assembly 10 is enclosed within the louvred structure 70 warm gas exits from filter bags 11, 12 into the space between the walls 71 of the louvred structure 70 and the filter bags 11, 12. The exhaust fan 73, 74 sucks atmospheric air in measured quantity through the louvres 72 which is admixed with the gas pouring outwardly from the filter bags 11, 12. The mixtures of gases is passed out of the structure through fans 73, 74.

By the use of the embodiment of FIGURE 2 the normal practice of heavily insulating the entire bag filter housing is overcome. Thus, in present practice, particularly in the carbon black industry, the entire bag filter housing is heavily insulated to maintain the temperature of the internal walls above the dew point of the off gas. For carbon black smoke this means that sufficient insulation has to be provided to maintain the gas above about 160° F. In accordance with this invention, however, a sufficient amount of ambient air is mixed with the off gas so that under most conditions the temperature can be easily maintained above the dew point of the resultant mixture of gases. The required ambient air-to-off gas mixture is readily calculated by those of skill in the art from gas-moisture phase relationships.

But, even under conditions where the atmospheric air cannot be so used without causing condensation, where condensation occurs, it will not adversely affect filtration pursuant to the present invention. Thus condensation, where it occurs, will form upon the walls of the louvred structure and not upon the surfaces of the filter bags themselves. This is because the outer bag surfaces remain quite warm due to the continuous passage of the hot off gas therethrough; even though considerable cooling may occur at some distance away from the bag surfaces. Moreover, even the momentary flexing of the bags themselves does not permit the temperature of the surfaces of the filter bags to drop to the dew point. So, by provision of conduits and drain surfaces upon or near the walls of the louvred structure the moisture can be easily and conveniently removed and without disruption or loss of efficiency in the operation as could be caused by moistening of the filter bags themselves.

The following non-limiting example is exemplary of the present invention.

*Example*

Carbon black laden off gas containing 125 grains per cubic foot of carbon black is continuously passed into the apparatus combination described by reference to FIGURES 1 and 2. The cycle of operation is conducted smoothly and efficiently. Carbon black is collected from the hopper and continuously discharged. The gas emanating through the pores of the filter bags is mixed with ambient air of 80° F. and 80% humidity in the proportions of 1 part of off gas per 8 parts of atmospheric air. It is found that no condensation occurs within the compartment containing the filter bags.

Admixing of the off gas with ambient air over a wide range of dilution: off-gas ratios of from 1:1 to 100:1 does not produce condensation of moisture upon the filter bags. This is because the mixture of gases never reaches a moisture saturation point.

When, on another day, the off gas is mixed with ambient air at 50° F. and 100% relative humidity, a ratio of dilution air to off gas of approximately 8:1 provides a completely dry mixture, and the carbon is collected smoothly and efficiently.

When the dilution ratio is raised to 10:1 some condensation occurs upon the side walls of the louvred structure. It is found however that the moisture accumulating upon the side walls drains therefrom, no condensation occurring upon the filter bags themselves. In this instance also the filtering action of the off gas through the filter bag surfaces is satisfactory and the carbon black is readily collected from the collection hopper.

While the preferred forms of the invention have been presented it is obvious that some modifications can be made without departing from its spirit and scope. In the present new and improved method and apparatus combination, especially useful in carbon black operations, an operating cycle is characterized by the passage of carbon black smoke into the plenum and collection hopper of a filter bag assembly, the smoke preferably entering the filter bags from both ends. This operation is continued by application of a positive pressure until a maximum acceptable pressure drop is obtained across the filter bags, this being a function of filter cloth material, gas-to-cloth ratios as is well known to those of skill in this art. At the end of the filtering cycle a negative pressure is exerted upon the filter bags via suction applied to the collection hopper. This causes the filter bags to flex momentarily inwardly, collapsing partially or completely, this breaking loose the caked and loose carbon black adhering to the inner surfaces of the bags. This back pressure is only momentary and differs from conventional operations wherein a reversed gas flow is maintained for a considerable time. Thus, the inward flexing of the filter bags in accordance with the present invention generally requires no more than a small fraction of a second or 1–2 seconds at most whereas conventional techniques require a reverse gas flow of several seconds, generally for at least 5–10 seconds and often longer. In fact, in conventional techniques there is a deliberate delicate balance between bag tension and reverse gas flow so that the filter bags do not completely collapse. Often rings, which limit filtering capacity, are spaced at intervals within the filter bags to prevent the complete collapse of the bags. This is done because complete collapsing of the bags prevents removal of carbon black from the bags. Such precautions are unnecessary in the present invention for it is immaterial whether the bags completely collapse or only partially collapse. Moreover, in conventional operation to assure that the bags are actually clean, the bags are allowed a deliberate prolonged null period so that the carbon black will settle out of the bags. Obviously, this is time consuming but moreover, the method is not entirely satisfactory because some of the precipitated carbon black reaerates into a very light dust having a very slow settling rate. Even the maximum time that can be allowed for this settling is insufficient for the bags to be completely purged. This is especially true of the recently widely used long tube, large diameter bag filters. A null period is not required, nor is it desirable pursuant to this invention, and therefore the present invention overcomes this problem inherent in most bag filter designs.

In the present invention, the bags momentarily flex inwardly dislodging carbon black from the inside of the bags, rapidly followed by a purging of the carbon black into the collection hopper. The quick purge forces smoke directly into the inside of the filter bags from their upper open ends, not through the bag pores distributed over its entire length. The flow will quickly purge a bag of any length.

Filtering in accordance with the present invention wherein the smoke enters from both ends of the filter bags, lessens condensation at start-up. Thus, during start-up with a cold unit off gas condensation occurs and wets the bags and walls containing the bags. In present operations having only single smoke entry features, as the unit is heated, the hot gas tends to channel through the first or entry portion of the bags, condensation occurs particularly at the opposite end of the bags. The double entry feature of the present invention reduces this condensation by simultaneously warming essentially all portions of the bag. Moreover, this feature eliminates the permanent blinding of the ends of single entry bags which reduces operating efficiency because these blind ends collect fine particle size dust which is never completely purged.

Another novel feature of this invention is that embodiment providing for the elimination of large quantities of bulky insulation; even for the filtration of gas stream having higher moisture content and fine particle solids. In the present invention insulation of plenum and collection hopper is all that is normally desirable.

I claim:

1. A device for treating a solids-bearing gas to separate and recover the finely divided solids content thereof, which comprises: a filter element assembly comprising at least one elongated hollow, tubular filter element the wall of which is substantially impervious to said finely divided solids but pervious to said gas; a plenum chamber supporting one end of said filter element and communicating with the interior thereof; a collection hopper supporting the other end of said filter element and also communicating with the interior thereof, said plenum chamber and said hopper communicating with each other through the interior of said filter element; a fan having discharge and suction sides, the discharge side communicating through first and second valved conduits with said plenum chamber and said collection hopper, respectively, and the suction side communicating through a line with a solids-bearing gas source and through a third valved conduit with said collection hopper, whereby said solids-bearing gas can be conveyed from said source through said fan, said first and second valved conduits, and said plenum chamber and said collection hopper into the interior of said filter element through both ends thereof, and gas can be conveyed from the interior of said filter element through said collection chamber and said third valved conduit to said fan; and a timer relay control mechanism for effecting an operating cycle comprising, in sequence, filtering, cleaning and purging operations; said timer mechanism simultaneously holding said first and second valved conduits open and said third valved conduit closed during said filtering operation, said first and second valved conduits closed and said third valved conduit open during said cleaning operation, and said first and third valved conduits open and said second valved conduit closed during said purging operation, whereby solids are caused to adhere to the interior surface of said filter element wall and gas to pass through said wall when solids-bearing gas is introduced under positive pressure into the interior of said filter element through both ends thereof during said filtering operation, said filter element wall is caused to flex inwardly under negative pressure thus dislodging said adhered solids during said cleaning operation, and said dislodged solids are conveyed to said collection hopper by virtue of a pressure differential created between said plenum chamber and said collection hopper through the interior of said filter element during said purging operation.

2. A device according to claim 1 in which the filter element assembly additionally comprises a housing surrounding said filter element; said housing being provided with means for exhausting gas therefrom and louvres being provided in at least some of the walls of said housing for admission of a dilution gas.

3. In a process for treating a solids-bearing gas to separate and recover the finely divided solids thereof in which said gas is caused to flow into the interior of an elongated, hollow, tubular filter element, the wall of which is substantially impervious to said finely divided solids but pervious to said gas, the improved operating cycle which comprises: introducing said solids-bearing gas under positive pressure into the interior of said filter element through both ends thereof whereby said gas is caused to pass through said wall while said solids are caused to adhere to the inside surface thereof; at a preconceived time, stopping the introduction of solids-bearing gas to said filter element and simultaneously applying a negative pressure to the interior of said filter element through one end thereof whereby said wall of said element is flexed and said adhered solids are dislodged therefrom; at a preconceived time and substantially instantaneously after initial application of said negative pressure and while said negative pressure is still applied, introducing a gas under positive pressure into the interior of said filter element through the end thereof opposite the end at which negative pressure is applied whereby a differential pressure is created between said two ends and said dislodged solids are caused to flow to said end at which negative pressure is applied; at a preconceived time repeating said operating cycle and periodically collecting said dislodged solids.

4. A process according to claim 3 in which the solids-bearing gas contains moisture and is above ambient temperature and a dilution gas is continuously introduced into a housing surrounding said filter element to form a mixture with the gas passing through said wall of said filter element, the rate of dilution gas introduction being such as to insure that the temperature of the outside surface of said wall remains above the dewpoint of said mixture.

5. A process according to claim 3 in which said gas introduced under pressure into the interior of said filter element through one end thereof while a negative pressure is being applied to the interior of said filter element through the other end thereof is said solids-bearing gas.

References Cited by the Examiner

UNITED STATES PATENTS

| 1,509,912 | 9/24  | Stebbins      | 55—303 |
| 2,576,656 | 11/51 | Wallin        | 55—382 |
| 2,792,074 | 5/57  | Schilb et al. | 55—261 |
| 3,097,936 | 7/63  | Lincoln       | 55—283 |

FOREIGN PATENTS

| 711,759 | 7/31 | France. |

HARRY B. THORNTON, *Primary Examiner.*